United States Patent
Hasan et al.

(10) Patent No.: US 9,432,255 B1
(45) Date of Patent: Aug. 30, 2016

(54) SYSTEMS AND METHODS FOR CONTROLLING NETWORK DEVICE TEMPORARILY ABSENT FROM CONTROL PANEL

(71) Applicant: Google Inc., Mountain View, CA (US)

(72) Inventors: Jahangir Hasan, Saratoga, CA (US); Rajababru Thatikunta, San Jose, CA (US); Joon Suan Ong, Cupertino, CA (US); Charles Robert Barker, Jr., Mountain View, CA (US); Lorenzo Vicisano, Berkley, CA (US); Subbaiah Naidu Kotla Venkata, Cupertino, CA (US); Victor Lin, Freemont, CA (US)

(73) Assignee: Google Inc., Mountain View, CA (US)

( * ) Notice: Subject to any disclaimer, the term of this patent is extended or adjusted under 35 U.S.C. 154(b) by 204 days.

(21) Appl. No.: 14/156,279

(22) Filed: Jan. 15, 2014

(51) Int. Cl.
  *G06F 15/173* (2006.01)
  *H04L 12/24* (2006.01)
(52) U.S. Cl.
  CPC .............................. *H04L 41/0816* (2013.01)
(58) Field of Classification Search
  CPC ........... H04L 41/0659; H04L 41/0672; H04L 41/0816
  USPC ................................................. 709/223, 227
  See application file for complete search history.

(56) References Cited

U.S. PATENT DOCUMENTS

| | | | |
|---|---|---|---|
| 6,742,134 B1 * | 5/2004 | Pothier ...................... | G06F 8/65 714/4.12 |
| 7,002,905 B1 | 2/2006 | Khouri et al. | |
| 7,609,617 B2 | 10/2009 | Appanna et al. | |
| 7,609,618 B1 | 10/2009 | Biswas et al. | |
| 8,306,097 B2 | 11/2012 | De Lind Van Wijangaarden et al. | |
| 8,499,060 B2 * | 7/2013 | Narayanan ................ | G06F 8/67 709/208 |
| 8,868,897 B2 * | 10/2014 | Clemm .................. | G06F 15/177 370/216 |
| 8,948,174 B2 * | 2/2015 | Szyszko .............. | H04L 47/2441 370/392 |
| 2002/0165961 A1 * | 11/2002 | Everdell ................. | H04L 41/22 709/225 |
| 2014/0201516 A1 * | 7/2014 | Bjarnason ............... | H04L 45/64 713/150 |

OTHER PUBLICATIONS

U.S. Appl. No. 13/344,397, filed Jan. 5, 2012, Ayaskant.
Buchegger, et al., Performance Analysis of the Confidant Protocol (Cooperation of Nodes: Fairness in Dynamic Ad-hoc NeTworks, Proceedings of the 3rd ACM international symposium on Mobile ad hoc networking & computing, ACM, Jun. 2002 (11 pages).

(Continued)

*Primary Examiner* — Phuoc Nguyen
(74) *Attorney, Agent, or Firm* — McDermott Will & Emery LLP

(57) ABSTRACT

Aspects and implementations of the present disclosure are directed to methods and systems for a network tolerant to a network device that is temporarily absent from the control plane. In one aspect, in general, the system includes an event manager configured to send, to a controller configured to exchange control messages with a network device, a first request to temporarily withdraw the network device from control plane interactions. The event manager then triggers an event at the network device during which the network device is non-responsive to control plane interactions. After determining that the event has completed, the event manager sends the controller a second request to restore the network device. The controller is configured to request, responsive to the first request, a network application to transition to a tolerant state; and to request, responsive to the second request, the network application to transition to a sensitive state.

20 Claims, 6 Drawing Sheets

(56) References Cited

OTHER PUBLICATIONS

Cisco White Paper, Cisco Catalyst 6500 High Availability: Deploying Redundant Supervisors for Maximum Uptime, Cisco Systems, Inc., Apr. 2009 (21 pages).

Das, et al., Application-Aware Aggregation and Traffic Engineering in a Converged Packet-Circuit Network, Optical Fiber Communication Conference and Exposition (OFC/NFOEC), 2011 and the National Fiber Optic Engineers Conference, IEEE, Mar. 2011 (3 pages).

Handigol, et al., Where is the Debugger for my Software-Defined Network?, Proceedings of the first workshop on Hot topics in software defined networks, ACM, Aug. 2012 (6 pages).

Jain, et al., B4: Experience with a Globally-Deployed Software Defined WAN, Proceedings of the ACM SIGCOMM 2013 conference on SIGCOMM, ACM, Aug. 2013 (12 pages).

Fall, Kevin, A Delay-Tolerant Network Architecture for Challenged Internets, Proceedings of the 2003 conference on Applications, technologies, architectures, and protocols for computer communications, ACM, Aug. 2003 (8 pages).

Levin, et al., Logically Centralized? State Distribution Trade-offs in Software Defined Networks, Proceedings of the first workshop on Hot topics in software defined networks. ACM, Aug. 2012 (6 pages).

Reitblatt, et al., Consistent Updates for Software-Defined Networks: Change You Can Believe In!, Proceedings of the 10th ACM Workshop on Hot Topics in Networks, ACM, Nov. 2011 (6 pages).

Open Networking Foundation White Paper, Software-Defined Networking: The New Norm for Networks, Apr. 13, 2012 (12 pages).

Vanbever, et al., HotSwap: Correct and Efficient Controller Upgrades for Software-Defined Networks, Proceedings of the workshop on Hot topics in software defined networks, ACM, Aug. 2013 (6 pages).

Yap, et al., Towards Software-Friendly Networks, Proceedings of the first ACM asia-pacific workshop on Workshop on systems, ACM, Aug. 2010 (5 pages).

* cited by examiner

SYSTEMS AND METHODS FOR CONTROLLING NETWORK DEVICE TEMPORARILY ABSENT FROM CONTROL PANEL

BACKGROUND

Computing systems can exchange information via a data network by transmitting and receiving data packets according to one or more communication protocols. Network devices propagate the data packets through the network according to each device's configuration settings, network discovery and routing protocols, and flow control embedded in data communication protocols (e.g., SIP or a TCP handshake). Generally, data packets containing control information form a "control plane," and data packets containing message content form a "data plane."

A software-defined network ("SDN") is a set of network devices in a data network that includes at least one network device that relies on a separate controller for configuration information such as updates to tables for routing network traffic. In some SDN implementations, an SDN controller is separated from a controlled network device by a network path reserved for control messages. This reserved control channel may also be referred to as the control plane. The SDN architecture separates network control from data packet forwarding. An SDN application may operate to manage network policies, regulate traffic patterns or resource usage, provide security, control a network protocol, provide quality of service commitments, or any other network task.

SUMMARY

In one aspect, the disclosure relates to a system. The system includes a network device event manager configured to perform the operations of: sending, to at least one network device controller configured to exchange control messages with a plurality of network devices including a first network device, a first request to temporarily withdraw the first network device from control plane interactions; triggering, subsequent to sending the first request, an event at the first network device during which the first network device is non-responsive to control plane interactions; determining that the first network device has completed the event; and sending, to the at least one network device controller responsive to the determination that the event has been completed, a second request to restore the first network device to control plane interactions. The system includes a network application configured to operate in multiple states, the multiple states including at least: a first state wherein the network application tolerates, without remedial action, control plane interaction non-responsiveness by the first network device; and a second state wherein the network application takes remedial action, respective to the first network device, responsive to control plane interaction non-responsiveness by the first network device. The system includes at least one network device controller configured to perform the operations of: requesting, responsive to receiving the first request from the network device event manager, the network application to transition to the first state; and requesting, responsive to receiving the second request from the network device event manager, the network application to transition to the second state.

In one aspect, the disclosure relates to a method. The method includes sending, by a network device event manager, to at least one network device controller configured to exchange control messages with a plurality of network devices including a first network device, a first request to temporarily withdraw the first network device from control plane interactions. The method includes requesting, by the at least one network device controller, responsive to receiving the first message from the network device event manager, a network application to operate in a first state wherein the network application tolerates, without remedial action, control plane interaction non-responsiveness by the first network device. The method includes triggering, by the network device event manager, subsequent to sending the first request, an event at the first network device during which the first network device is non-responsive to control plane interactions. The method includes determining, by the network device event manager, that the first network device has completed the event. The method includes sending, by the network device event manager, to the at least one network device controller responsive to the determination that the event has been completed, a second request to restore the first network device to control plane interactions. The method includes requesting, by the at least one network device controller, responsive to receiving the second request from the network device event manager, the network application to transition to a second state wherein the network application takes remedial action, respective to the first network device, responsive to control plane interaction non-responsiveness by the first network device.

BRIEF DESCRIPTION OF THE DRAWINGS

The above and related objects, features, and advantages of the present disclosure will be more fully understood by reference to the following detailed description, when taken in conjunction with the following figures, wherein.

Like reference numbers and designations in the various drawings indicate like elements.

DETAILED DESCRIPTION

Aspects and implementations of the present disclosure generally relate to managing control plane interactions with a network device while the network device is subject to an event in which the network device can still forward data packets in the data plane, but is non-responsive in the control plane. For example, some network devices can reboot the computing components responsible for processing, and responding to, control messages while leaving the components responsible for processing data packets undisturbed.

At a high level, this can be achieved by running a dedicated packet forwarding engine separate from the network device central processor. For example, the packet forwarding engine can disengage from the central processor, the central processor can then handle the event while the packet forwarding engine continues forwarding packets, and the central processor can then reengage with the packet forwarding engine after the event. This process keeps the data plane through the switch alive. As a result, it is possible for other network participants, e.g., peer network devices, to continue forwarding data packets through the network device while it is non-responsive to control plane interactions.

However, peer network devices that detect a non-responsive network device, specifically, non-responsiveness with regard to control plane interactions, may perceive the non-responsive network device as failed. The peer device will typically take remedial action to avoid sending data packets to the perceived-failed network device. For example, the peer device may remove the perceived-failed network device from its routing tables. This disruption of the network configuration is unnecessary and causes a loss of network bandwidth and possibly even loss of access to one or more host servers.

Figure 1:
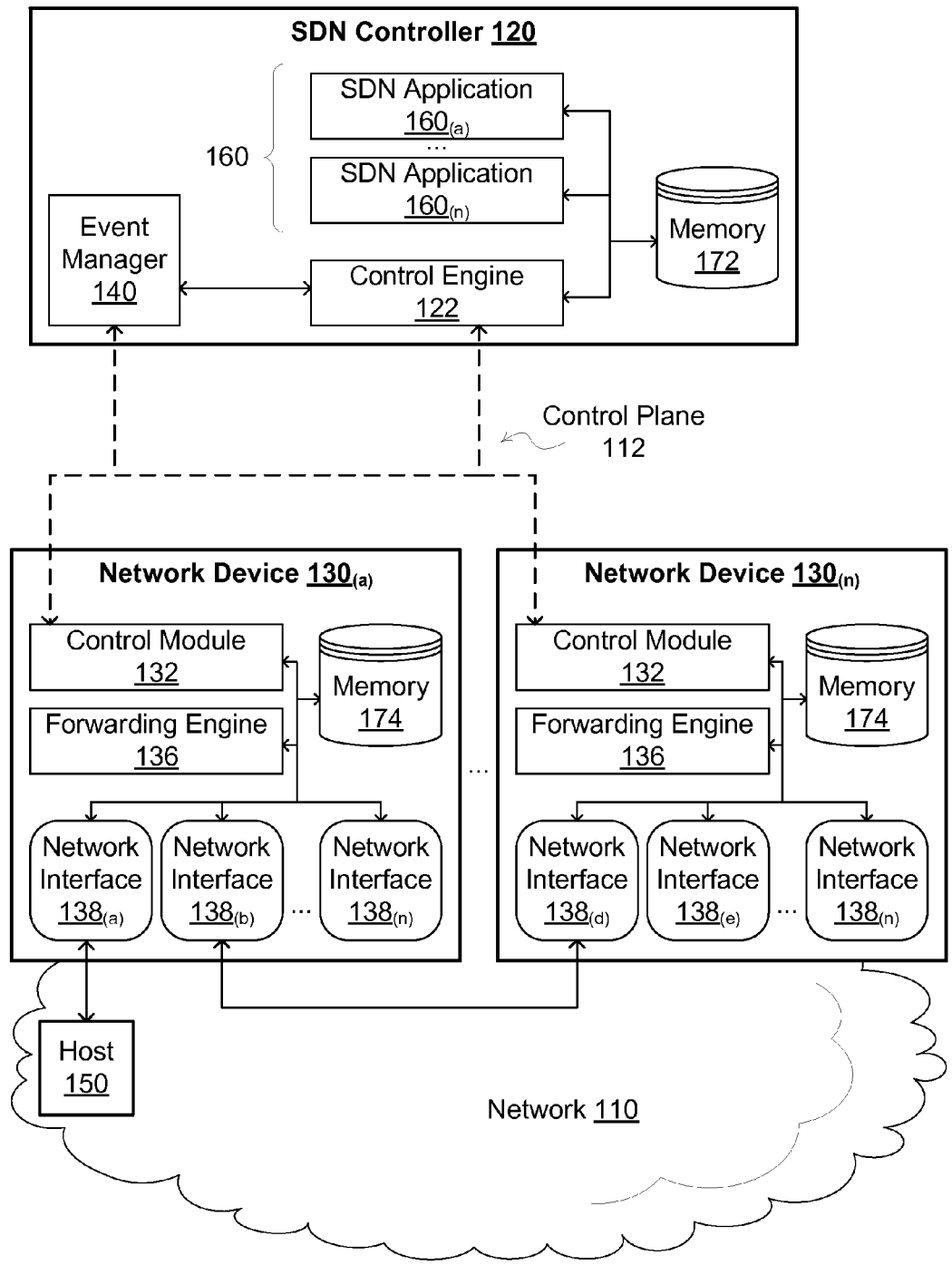
FIG. 1 is a block diagram of an example network environment.

FIG. 1 is a block diagram of an example network environment including a software-defined network ("SDN"). In broad overview, the illustrated network environment includes multiple network devices $130_a$-$130_n$ (generally a network device 130) controlled by an SDN controller 120. The SDN controller 120 includes a memory 172 and a control engine 122. The SDN controller 120 is illustrated as a controller suite that includes one or more SDN applications 160 and an event manager 140. However, in some implementations, the event manager 140 and/or the SDN applications are implemented separately from the SDN controller 120.

Each network device 130 includes a memory 174, a forwarding engine 136, and multiple network interfaces $138_a$-$138_n$ (generally network interfaces 138). Each network device 130 also includes a control module 132, which interacts with the control engine 122 of the SDN controller 120 via a control plane 112. The control plane 112 can be dedicated links separated from links used to convey data packets (i.e., the data plane), or the control plane 112 can share links with the data plane. The network devices $130_a$-$130_n$ interact with devices in a network 110. For example, in FIG. 1, a first network device $130_a$ is linked to a host 150 via a first network interface $138_a$, and the network device $130_a$ is also linked to a peer network device $130_n$ via a second network interface $138_b$.

In more detail, the network device 130 participates in the data network 110 by receiving and sending data packets via the network interfaces 138. Each network interface 138 may be connected to other network devices, e.g., via a data plane. In some implementations, the connections are bi-directional data links. In some implementations, the connections are uni-directional data links, where each link is either an ingress or egress. The other network devices send data packets to the network device 130, which may then forward them to another network device according to its configuration (e.g., rules or routing information stored in memory 174). For example, a data packet may arrive at the network device $130_a$ via a first interface (e.g., network interface $138_a$), causing the forwarding engine 136 to process the received data packet and, for example, forward it to an appropriate next-hop (e.g., a peer network device $130_a$) via a second interface (e.g., network interface $138_b$). The forwarding engine 136 determines which network interface 138 to use to forward each data packet received. In some implementations, a network device 130 is a top-of-rack switch. In some implementations, a network device 130 is an unavoidable network device with regard to a host server (e.g., host 150) such that if the network device 130 fails, there is no network path to the host server.

The network device 130 includes a control module 132 and memory 174, which stores configuration, rules, and/or routing data. In some implementations, the control module 132 is implemented as a special purpose circuit (e.g., an ASIC). In some implementations, the control module 132 is implemented as a set of computer executable instruction sets stored in computer accessible memory and executed by one or more computing processors. The network device control module 132 is configured to receive configuration and routing information and to update the configuration and routing data stored in memory 174. In some implementations, the control module 132 receives routing data from other network devices in the network 110, e.g., using ICMP or BGP messages. In some implementations, the network device 130 participates in a software-defined network ("SDN"), and the network device control module 132 receives configuration and routing information from an SDN controller, such as the controller 120, e.g., via a control plane 112.

The forwarding engine 136 uses the rules, configuration, and routing data stored in memory 174 to manage the data traffic received at the network interfaces 138. In some implementations, the forwarding engine 136 is implemented as a special purpose circuit (e.g., an ASIC). In some implementations, the forwarding engine 136 is implemented as a set of computer executable instruction sets stored in computer accessible memory and executed by one or more computing processors. The forwarding engine 136 extracts address information from a data packet (e.g., an IP address from a packet header) and processes it to determine how to handle the data packet (e.g., whether to forward the data packet and/or which network interface 136 to use for forwarding the data packet). In some implementations, a forwarding engine 136 can operate independently from other components of the network device 130, such as the control module 132.

The network device memory 174 may be any device suitable for storing computer readable data. The memory 174 may be similar to the memory 670 or cache 675 illustrated in FIG. 6 described below. Examples include, but are not limited to, semiconductor memory devices such as EPROM, EEPROM, SDRAM, and flash memory devices. A network device 130 may have any number of memory devices 174.

The data network 110 is a network facilitating interactions between computing devices. An illustrative example data network 110 is the Internet; however, other networks may be used. The data network 110 may be composed of multiple connected sub-networks. The data network 110 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. The data network 110 may be any type and/or form of data network and/or communication network. The data network 110 may be public, private, or a combination of public and private networks. In general, the data network 110 is a data-centric network used to convey information between computing devices, e.g., host 150, and each network device 130 facilitates this communication according to its respective configuration.

As indicated above, the SDN controller 120 includes a memory 172 and a control engine 122. The SDN controller 120 is illustrated as a suite that includes one or more SDN applications 160 and an event manager 140. However, in some implementations, the event manager 140 and/or the SDN applications are implemented separately from the SDN controller 120. In some implementations, the SDN controller is implemented as a server including one or more computing processors and memory 172. In some implementations, one or more of the control engine 122, the event manager 140, and the SDN applications 160, are implemented as a set of computer executable instruction sets stored in computer accessible memory (e.g., memory 172) and executed by one or more computing processors. In some implementations, one or more of the control engine 122, the event manager 140, and the SDN applications 160, are implemented as a special purpose circuit (e.g., an ASIC). In some implementations, the SDN controller is implemented as a virtual server. In some implementations, the SDN controller 120 has a dedicated communication channel for exchanging messages with the network devices 130.

The control engine 122 exchanges control messages with network devices 130 in the SDN. In some implementations, the control engine 122 uses configuration and routing data stored in memory 172 to configure the network devices 130. In some implementations, the control engine 122 periodically sends a status message to each network device 130. In some implementations, the control engine 122 periodically requests status information from each network device 130.

The event manager 140 manages events at the network devices 130. In some implementations, the event manager 140 is implemented as part of the SDN controller 120, as illustrated. In some implementations, the event manager 140 is implemented separately from the SDN controller 120. In some implementations, the event manager 140 is implemented as part of a network device 130. In some implementations, there is an event manager 140 for each network device 130. In some implementations, the event manager 140 is implemented as a set of computer executable instruction sets stored in computer accessible memory and executed by a computing processor for each event to be managed. In some implementations, an SDN controller 120 executes an event manager 140 to control a specific event for a specific network device 130. For example, the SDN controller 120, in order to upgrade or reboot a network device 130, may spawn an event manager 140 to manage the upgrade or reboot event. In some implementations, an event manager 140 is a multi-threaded process, and a new thread is spawned for each event.

The SDN application 160 operates to control some aspect of the network. For example, an SDN application may operate to manage network policies, regulate traffic patterns or resource usage, provide security, control a network protocol, provide quality of service commitments, or any other network task. In some implementations, each SDN application 160 is implemented as part of the SDN controller 120, as illustrated. In some implementations, an SDN application 160 is implemented separately from the SDN controller 120. In some implementations, an SDN application 160 controls the Address Resolution Protocol, Simple Network Management Protocol, Link Aggregation Control Protocol, Link Layer Discovery Protocol, Open Shortest Path First routing protocol, or the Border Gateway Protocol.

As described below, at least one SDN application 160 can operate in at least two states: a "sensitive" state, and a "tolerant" state. In the "sensitive" state, the SDN application is sensitive to failed control plane interactions. For example, an SDN application 160 in a "sensitive" state may take remedial action to avoid sending data packets to a network device it perceives as having failed, e.g., a network device that is non-responsive to control plane interaction. In the "tolerant" state, the SDN application is tolerant of failed control plane interactions. A network device 130 that is non-responsive to control plane interaction may be functional in the data plane (e.g., the device's forwarding engine 136 may still be forwarding data packets), and an SDN application 160 in a "tolerant" state may refrain from taking remedial action to avoid disturbing the data plane through the network device 130.

The controller memory 172 may be any device suitable for storing computer readable data. The memory 172 may be similar to the memory 670 or cache 675 illustrated in FIG. 6 and described below. Examples include, but are not limited to, semiconductor memory devices such as EPROM, EEPROM, SDRAM, and flash memory devices. An SDN controller 120 may have any number of memory devices 172.

Figure 2A:
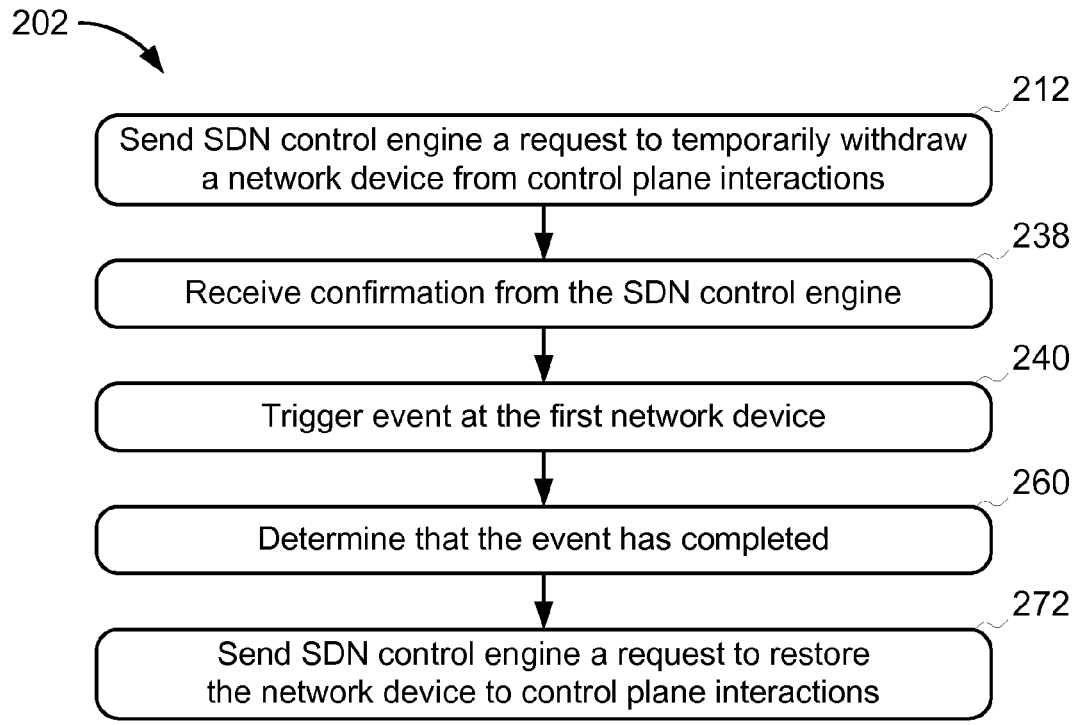
FIG. 2A is a flowchart for an example method in which an event manager triggers an event at a network device, during which the network device is non-responsive to control plane interactions.
Figure 2B:
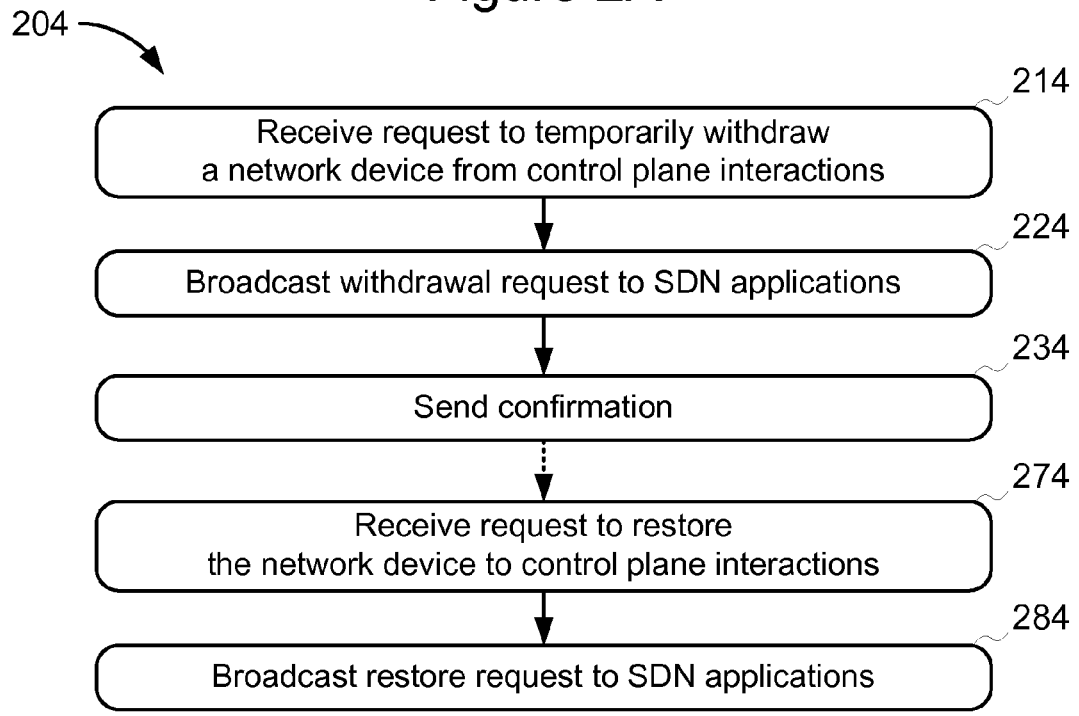
FIG. 2B is a flowchart for an example method in which an SDN controller causes SDN applications to temporarily tolerate a network device that is non-responsive to control plane interactions.
Figure 3:
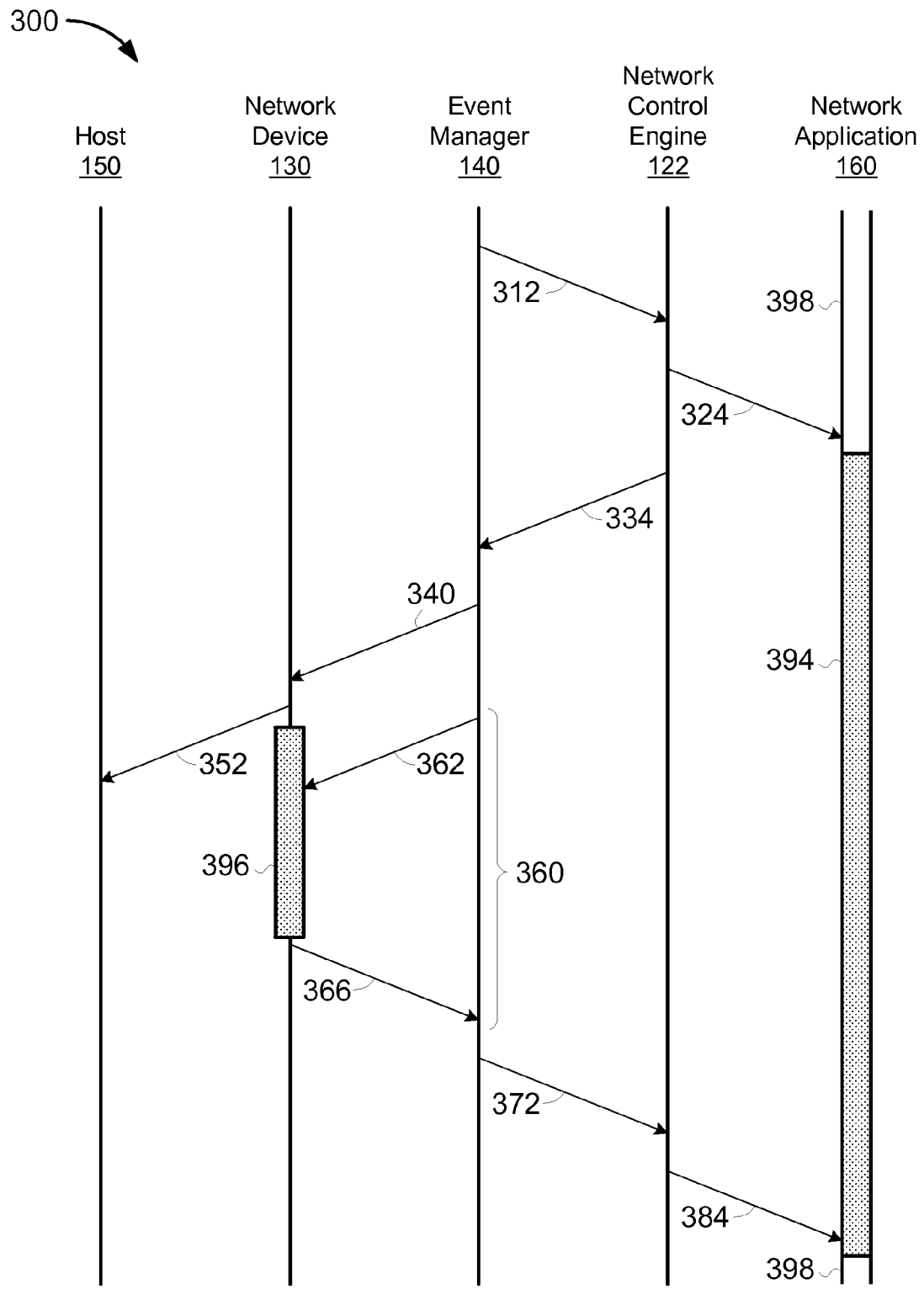
FIG. 3 is a timeline for messages passed during an example method.

FIG. 2A is a flow chart of a method 202 of temporarily withdrawing a network device from the control plane of a network, which can be carried out by a network device event manager. FIG. 2B is a flow chart of a method 204 for managing a network device's temporary withdrawal from the control plane of a network. FIG. 3 shows a timing diagram illustrating the timing of various message transmissions and events that occur during the execution of the methods 202 and 204 shown in FIGS. 2A and 2B. As such, all three figures are described further below together.

As set forth above, FIG. 2A shows a flow chart of a method 202 of temporarily withdrawing a network device, e.g., the network device $130_a$ shown in FIG. 1, from the control plane of a network. In brief overview, the method 202 includes a network device event manager (e.g., the event manager 140 illustrated in FIG. 1) sending an SDN control engine (e.g., the control engine 122 illustrated in FIG. 1) a request to temporarily withdraw a network device from control plane interactions (stage 212) and receiving conformation from the SDN control engine of the withdrawal (stage 238). The method further includes triggering an event at the network device that renders the network device non-responsive to control plane operations while it remains active in the data plane (stage 240). The network device event manager then determines that the event has completed (stage 260) and sends the SDN control engine a request to restore the network device to control plane interactions (stage 272). The method 204 shown in FIG. 2B beings with an SDN control engine receiving a request from a network device event manager to temporarily withdraw a network device from control plane interactions (stage 214). The SDN control engine then disseminates the withdrawal request to one or more SDN applications (stage 224) and sends confirmation back to network device (stage 234). After a period of time, the SDN control engine receives a request from the network device to be restored to control plane interactions (stage 274). The SDN control engine then disseminates the request to the SDN applications (stage 284). The timing diagram 300, shown in FIG. 3, illustrates the relative temporal ordering of each of the above steps, with time progressing from the top of the timing diagram 300 to the bottom.

The process of a network device temporarily withdrawing from the control plane of a network begins with a network device event manager transmitting a request to withdraw to an SDN control engine (stage 212 of FIG. 2A) and the SDN control engine receiving the request (stage 214 of FIG. 2B).

This communication is represented in the timing diagram 300 by the arrow 312, leading from the network device to the SDN controller. The event manager 140 sends this withdrawal request 312 in preparation for an event during which the network device 130 will continue to function in the data plane, but may appear to have failed in the control plane. For example, the event may be an upgrade of a control application, a control component, or other aspect of the network device 130. The event may include a reboot of the network device 130. In some implementations, the withdrawal request includes an identifier for the network device. In some implementations, the withdrawal request includes an estimated length of time until the network device will be available to rejoin the control plane. In some implementations, the withdrawal request includes additional parameters.

Next, as indicated by arrow 324 in the timing diagram 300, the SDN control engine disseminates the withdrawal request to one or more SDN applications (stage 224 of FIG. 2B). In some implementations, the SDN control engine transmits the message 312 received from the network device event manager. In some implementations, the SDN control engine transmits a different message. In some implementations, the SDN control engine transmits a message 324 that includes an identifier for the network device. In some implementations, the SDN control engine transmits a specific message for each SDN application. In some implementations, a network application 160 has registered to receive the message 324. In some implementations, the control engine 122 provides an application program interface (API) to the network application 160, and the network application 160 uses the API to receive the message 324. In some implementations, the network controller 120 broadcasts the message 324 to multiple network applications 160.

As described in more detail below, in reference to FIG. 5, in some implementations, in response to the notification from the SDN control engine that a network device is temporarily withdrawing from the control plane, the SDN applications may transition from a "sensitive" state to a "tolerant" state with respect to the network device identified by the withdrawal message 324. In the "sensitive" state, the applications perceive non-responsiveness to control plane interactions as an indication of a device failure. An SDN application may take remedial action to avoid sending traffic to a network device that is perceived as failed. In the "tolerant" state, the applications refrain from such remedial actions with regard to the network device that has temporarily withdrawn. In some implementations, the SDN application is quiesced with regard to the network device 130.

After the request is disseminated to the SDN applications, the SDN control engine sends a confirmation message back to the network device (stage 234 of FIG. 2B). The message is represented on the timing diagram as arrow 334. In some implementations, the control engine 122 sends the confirmation message 334 after the control engine 122 has notified the network applications 160 of the withdrawal request. In some implementations, the control engine 122 sends the confirmation message 334 after the control engine 122 has verified that the network applications 160 are prepared for the network device to withdraw from control plane interactions.

The event manager 140 subsequently receives a confirmation message 334 from the SDN control engine 122 (stage 238 of FIG. 2A). In some implementations, the confirmation message 334 indicates that the control engine 122 has notified the network applications 160 of the withdrawal request. In some implementations, the confirmation message 334 confirms that the network applications are ready for the network device 130 to withdraw from control plane interactions.

The event manager 140 then triggers the event at the network device 130 (stage 240). In some implementations, the network device event manager 140 triggers the event in response to receiving the confirmation message 334. In some implementations, the network device triggers the event by sending an event initiation message 340 to the network device 130. In some implementations, the network device event manager 140 triggers the event through a series of interactions with the network device 130. For example, the event may be an upgrade of a control application, a control component, or other aspect of the network device 130, followed by a reboot of the network device 130—the event manager 140 may send a first message to initiate the upgrade and a subsequent message to reboot the network device 130 after the upgrade completes.

In some implementations, the network device 130 may notify linked devices not controlled by the SDN controller 120, e.g., host 150, of the event. That is, prior to exiting the control plane, the network device 130 may send a message, shown as an arrow 352 in the timing diagram 300 of FIG. 3, to a host 150, e.g., using a signaling protocol. In some implementations, the link layer discovery protocol ("LLDP") is used as the signaling protocol for notifying hosts of the event. In some implementations, other protocols are used as the signaling protocol, e.g., CDP, SONMP, or LLTD. The host server 150 can then freeze gateway address entries and link aggregation entries corresponding to the network device 130 until further notification or until a timer elapses. For example, a gateway address entry, such as an ARP entry, or a link aggregation entry, such as for a LACP trunk, may be frozen by not updating timers associated with an entry or by ignoring an expired timer associated with an entry, i.e., retaining information that might otherwise be considered "stale". In some implementations, a secondary timer is used to ensure that stale information is not retained past a secondary threshold of time. In some implementations, the host 150 extends deadlines or timers associated with the network device 130. In some implementations, the host 150 ignores errors related to control plane interaction failures with the network device 130. For example, a host 150 may obtain information associated with the network device 130, e.g., using LLDP. An LLDP packet includes information elements ("TLV"s) that indicate various information about the neighbor device, i.e., the network device 130, and there is usually an element for a number of seconds for which the information is valid (a time-to-live or "TTL," which is typically 120 seconds). In some implementations, the network device 130 sends (as the notification 352) an LLDP packet with a very long TTL so that the host server 150 will not expect another LLDP update until after the event has likely ended. In some implementations, the host server 150, upon receiving a notification 352 that the network device 130 will be temporarily absent from the control plane, sets an internal timer to retain previously received information for an extended length of time.

The network device 130 then undergoes the event. During the event, there is a period of time, shown as a bar 396 in FIG. 3, for which the network device is non-responsive to control plane interactions. The network device 130 is still functional on the data plane and may still forward received data packets. However, the network device 130 does not respond, or does not respond reliably, to control messages.

Subsequent to triggering the event, the event manager 140 determines that the event has completed and that the network device is ready to resume control plane interactions (stage 260 of FIG. 2A). Generally, while the network device 130 is non-responsive to control plane interactions, the event manager 140 is unable to determine status information for the network device 130. In some implementations, the event manager 140 periodically polls the network device 130, sending one or more requests (shown as arrow 362 in FIG. 3) to solicit a response (shown as arrow 366 in FIG. 3) indicating that the network device 130 has completed the event. In some implementations, at the end of the period 396 of non-responsiveness, the network device 130 generates and sends a message (shown as arrow 366 in FIG. 3) to the event manager 140, to report event completion. That is, in some implementations, the event manager 140 can determine that the event has completed without sending polling messages. In some implementations, the event manager 140 maintains a timer for the event. If the timer expires prior to receiving a response 366 from the network device 130 indicating recovery, the event manager 140 determines that the network device has failed.

Once the event manager 140 has determined that the event has completed (stage 260 of FIG. 2A), the event manager 140 then sends the network control engine 122 a request 372 to restore the network device 130 to control plane interactions (stage 272 of FIG. 2A).

During the event, for a period of time 396, the network device 130 is non-responsive to control plane interactions. When the network device 130 has recovered, i.e., when the event is over, the method 204 continues. This delay is indicated in FIG. 2B by a dotted arrow.

After the event has completed, the network controller 120, or more specifically the network control engine 122, receives a request (shown as arrow 372 in FIG. 3) to restore the network device 130 to control plane interactions (stage 274 in FIG. 2B). The network control engine 122, responsive to receiving this request 372, then transmits a restoration request (shown as arrow 384 in FIG. 3) to one or more network applications 160 (stage 284 in FIG. 2B). In some implementations, a network application 160 has registered to receive the restoration request 372. As indicated above, in some implementations, the control engine 122 provides an application program interface (API) to the network application 160, and the network application 160 uses the API to receive the restoration request 372. In some implementations, the network controller 120 broadcasts the restoration request 372 to multiple network applications 160. The network applications then transition to a "sensitive" state 398 with regard to the network device. See, e.g., FIG. 5, described below.

Figure 4:
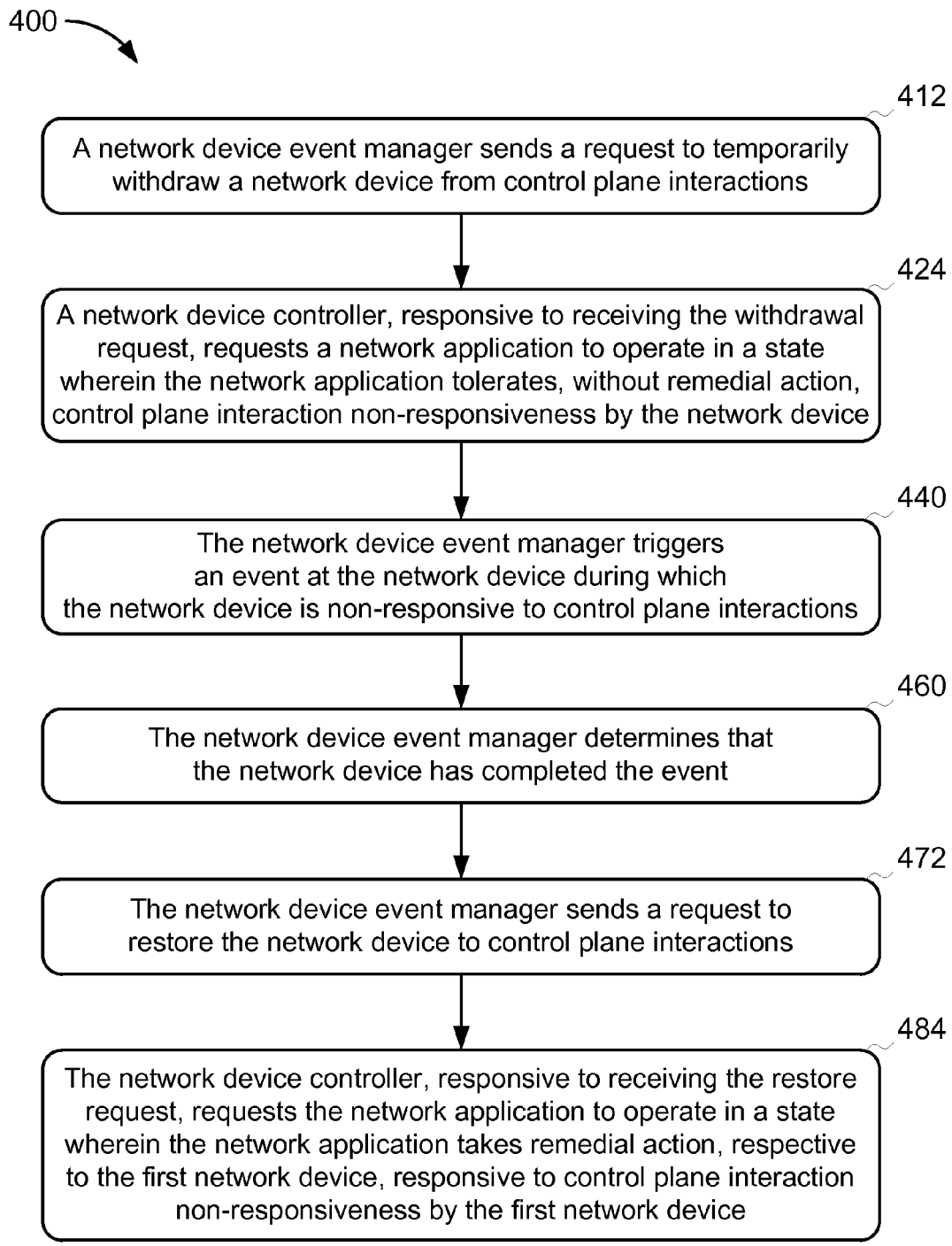
FIG. 4 is a flowchart for an example method of a control suite temporarily withdrawing a network device from control plane interactions for the duration of an event.

FIG. 4 is a flowchart for an example method of a control suite temporarily withdrawing a network device from control plane interactions for the duration of an event. The control suite includes a network device event manager and a network device control engine. In some implementations, the event manager and the control engine are components of a unified system. In some implementations, the event manager and the control engine are separate. In broad overview, the method 400 begins with a network device event manager sending a request to temporarily withdraw a network device from control plane interaction (stage 412). A network device control engine, responsive to receiving the withdrawal request, requests a network application to operate in a state wherein the network application tolerates, without remedial action, control plane interaction non-responsiveness by the network device (stage 424). The network device event manager then triggers an event at the network device during which the network device is non-responsive to control plane interactions (stage 440). The network device event manager determines that the network device has completed the event (stage 460) and subsequently sends a request to restore the network device to control plane interactions (stage 472). The network device controller, responsive to receiving the restore request, requests the network application to operate in a state wherein the network application takes remedial action, respective to the first network device, responsive to control plane interaction non-responsiveness by the first network device (stage 484).

In more detail, referring to FIG. 4, the method 400 begins with a network device event manager sending a request to temporarily withdraw a network device from control plane interaction (stage 412). For example, as described above in reference to FIGS. 2A and 3, at stage 212, the network device event manager 140 sends a request (shown as arrow 312 in FIG. 3) to the network controller 120, or more specifically, to the network control engine 122.

Referring to FIGS. 2B, 3, and 4, the network device control engine 122, responsive to receiving the withdrawal request 312, requests a network application 160 to operate in a state wherein the network application tolerates, without remedial action, control plane interaction non-responsiveness by the network device (stage 424). For example, as described above in reference to FIGS. 2B and 3, at stage 224, the network controller 120 sends a message 324 to a network application 160.

After sending the request 312 to temporarily withdraw a network device 130 from control plane interaction (stage 412), the network device event manager 140 then triggers an event at the network device 130 during which the network device 130 is non-responsive to control plane interactions (stage 440). For example, as described above in reference to FIGS. 2A and 3, at stage 240, the network device event manager 140 sends a request 340 to the network device 130.

The network device event manager 140 determines that the network device has completed the event (stage 460). For example, in some implementations, as described above in reference to FIGS. 2A and 3, at stage 260, the network device event manager 140 periodically sends a polling message 362 to the network device 130 to solicit a response 366 indicating that the network device 130 is responsive.

The network device event manager 140 subsequently sends a request to restore the network device to control plane interactions (stage 472). For example, as described above in reference to FIGS. 2A and 3, at stage 272, the network device event manager 140 sends a request 372 to the network controller 120, or more specifically, to the network control engine 122.

The network device control engine 122, responsive to receiving the restore request 372, requests the network application 160 to operate in a state wherein the network application takes remedial action, respective to the first network device, responsive to control plane interaction non-responsiveness by the first network device (stage 484). For example, as described above in reference to FIGS. 2B and 3, at stage 284, the network controller 120 sends a request 384 to the network application 160.

Figure 5:
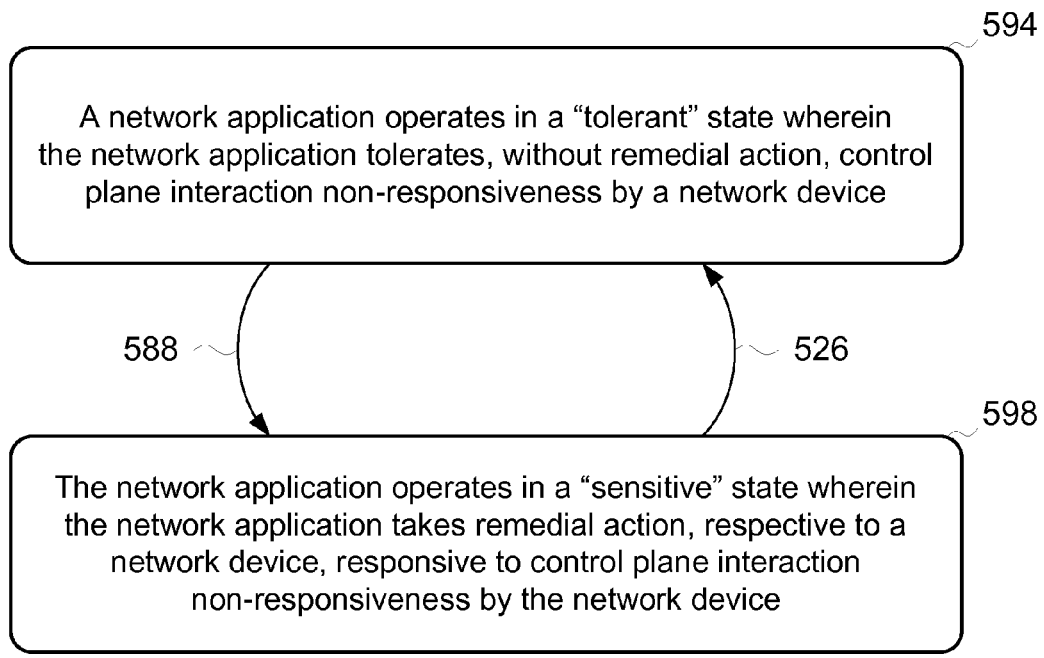
FIG. 5 is a state diagram for a network application.

FIG. 5 is a state diagram for a network application. A network application may implement a network protocol or service. A network application may dynamically manage network resources according to implementation-specific requirements. A network application may monitor network usage and adjust network behavior to optimize resource usage. In general, a network application operates in at least two states with respect to a given network device: a tolerant state 594 wherein the network application tolerates control plane interaction non-responsiveness by the network device, and a sensitive state 598 wherein the network application does not tolerate control plane interaction non-responsiveness by the network device. In the sensitive state 598, the network application takes remedial action, respective to the non-responsive network device. The sensitive state 598 is typically a normal operational state, and the tolerant state 594 is typically an exceptional state reserved for special circumstances, such as where the network device is functional on the data plane but non-responsive on the control plane.

Referring to FIG. 5 in more detail, a network application in a sensitive state 598 can transition to a tolerant state 594 (transition 526) with respect to a given network device. In some implementations, the network application switches states responsive to receipt of a notification that the network device is entering a non-responsive mode. In some implementations, the network application registers with a control engine to receive these notifications and the control engine notifies all such registered applications. In some implementations, the network application detects that a network device is functional on the data plane but non-responsive on the control plane and transitions to the tolerant state 594 in response to this detection.

While in the tolerant state 594, the network application functions in a manner that avoids unnecessary remedial action. In some implementations, the network application refrains from transmitting control messages to the network device. In some implementations, the network application ignores error messages related to the network device. In some implementations, the network application freezes any timers associated with the network device. In some implementations, the network application ignores expired timers related to the network device. For example, a network application may maintain status information for the network device, and may be configured to remove stale status information after a period of time. To remain active, status information for a network device is periodically updated. For example, the network device may periodically tender status information or may be periodically probed for new status information. The status information may include a timestamp indicating time of collection; the status information may include a timestamp indicating an expiration time. In some implementations, a network application in the tolerant state 594 does not remove or invalidate status information related to a network device absent from the control plane, even if the status information is "stale" as indicated where the collection time is older than a threshold or where the expiration time has passed. In some implementations, the network application retains stale status information for the network device until the status information is updated. The status information may include a time-to-live ("TTL") indicating a number of time units for which the data is valid. The TTL may be periodically decremented. In some implementations, a network application in the tolerant state 594 does not decrement a TTL for status information related to a network device absent from the control plane.

A network application in a tolerant state 594 can transition to a sensitive state 598 (transition 588) with respect to a given network device. In some implementations, the network application switches states responsive to receipt of a notification that the network device has recovered from a non-responsive mode. In some implementations, the network application registers with a control engine to receive these notifications and the control engine notifies all such registered applications. In some implementations, the network application detects that a network device is functional on the control plane and transitions to the sensitive state 594 in response to this detection. In some implementations, a network application transitions to the sensitive state 598 in response to receiving new status information from the network device. In some implementations, a network application receives notification that the network device has recovered and, responsive to this notification, the network application requests new status information from the network device. In some such implementations, the network application waits to transition to a sensitive state 598 until receipt of the new status information or until expiration of a recovery timer (e.g., the network application may require that the network device provide updated status information within a pre-set period of time after notification of recovery).

While in the sensitive state 598, the network application functions in a manner that takes remedial action when a network device is non-responsive to control plane interactions or otherwise perceived as to have failed. In some implementations, remedial action includes removing status information related to the network device from memory. In some implementations, remedial action includes generating new routing tables and/or new routing rules that avoid the network device. In some implementations, remedial action includes propagating failure notifications pertaining to the network device (and/or network destinations only accessible via the network device) to peer network devices. Remedial action may be disruptive to the network.

Figure 6:
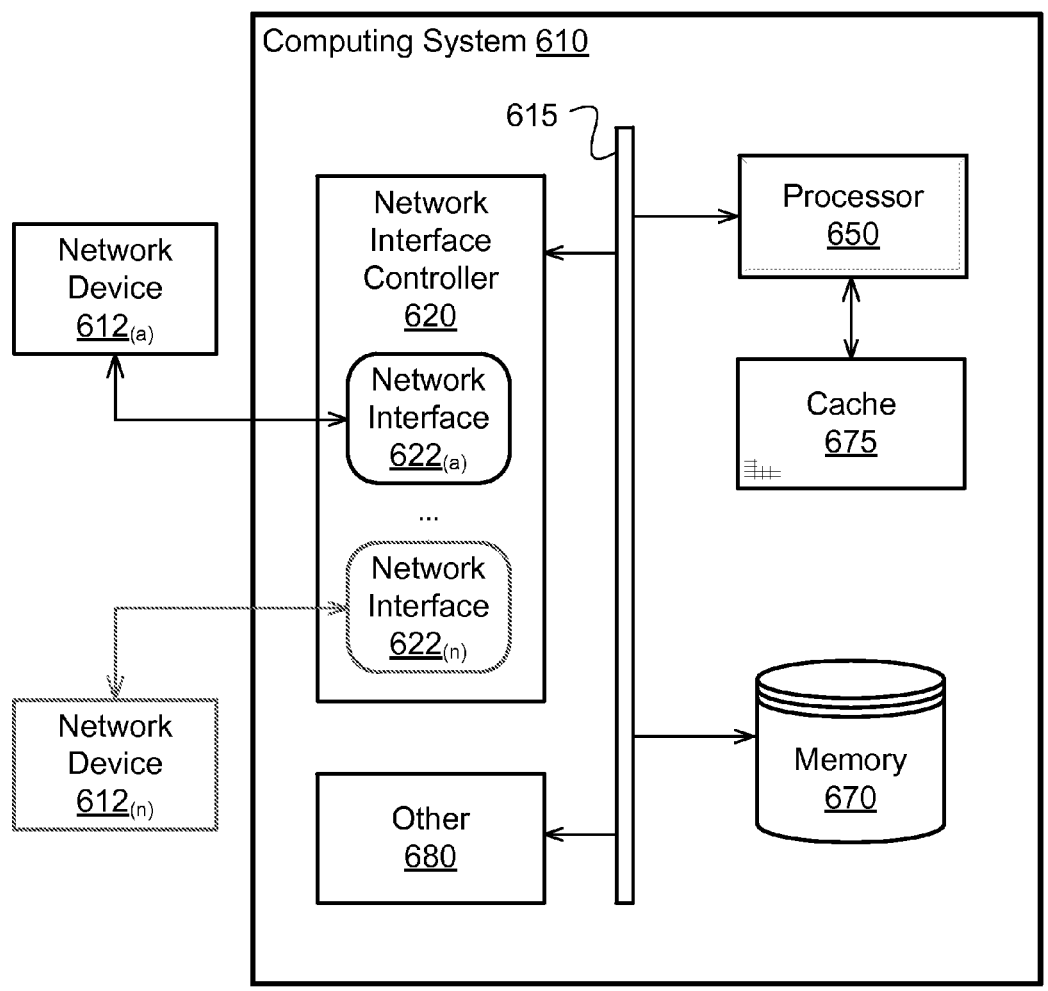
FIG. 6 is a block diagram of a computing system in accordance with an illustrative implementation.

FIG. 6 is a block diagram of a computing system for use in implementing the computerized components described herein, in accordance with an illustrative implementation. In broad overview, the computing system includes at least one processor 650 for performing actions in accordance with instructions and one or more memory devices 670 or 675 for storing instructions and data. The illustrated example computing system 610 includes one or more processors 650 in communication, via a bus 615, with at least one network interface controller 620 with one or more network interfaces 622$_{(a-n)}$ connecting to network devices 612$_{(a-n)}$, memory 670, and any other devices 680, e.g., an I/O interface. Generally, a processor 650 will execute instructions received from memory. The processor 650 illustrated incorporates, or is directly connected to, cache memory 675.

In more detail, the processor 650 may be any logic circuitry that processes instructions, e.g., instructions fetched from the memory 670 or cache 675. In many embodiments, the processor 650 is a microprocessor unit or special purpose processor. The computing device 610 may be based on any processor, or set of processors, capable of operating as described herein. The processor 650 may be a single core or multi-core processor. The processor 650 may be multiple processors.

The memory 670 may be any device suitable for storing computer readable data. The memory 670 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-Ray® discs). A computing system 610 may have any number of memory devices 670.

The cache memory 675 is generally a form of computer memory placed in close proximity to the processor 650 for fast read times. In some implementations, the cache memory 675 is part of, or on the same chip as, the processor 650. In some implementations, there are multiple levels of cache 675, e.g., L2 and L3 cache layers.

The network interface controller 620 manages data exchanges via the network interfaces $622_{(a-n)}$ (generally network interface 622). The network interface controller 620 handles the physical and data link layers of the OSI model for network communication. In some implementations, some of the network interface controller's tasks are handled by the processor 650. In some implementations, the network interface controller 620 is part of the processor 650. In some implementations, a computing system 610 has multiple network interface controllers 620. The network interfaces $622_{(a-n)}$ are connection points for physical network links. In some implementations, the network interface controller 620 supports wireless network connections and an interface 622 is a wireless receiver/transmitter. Generally, a computing device 610 exchanges data with other computing devices $612_{(a-n)}$ via physical or wireless links to a network interface $622_{(a-n)}$. In some implementations, the network interface controller 620 implements a network protocol such as Ethernet.

The other computing devices $612_{(a-n)}$ are connected to the computing device 610 via a network interface 622. The other computing devices $612_{(a-n)}$ may be peer computing devices, network devices, or any other computing device with network functionality. For example, a first computing device $612_{(a)}$ may be a network device such as a hub, a bridge, a switch, or a router, connecting the computing device 610 to a data network such as the Internet.

The other devices 680 may include an I/O interface, external serial device ports, and any additional co-processors. For example, a computing system 610 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 610 includes an additional device 680 such as a co-processor, e.g., a math co-processor can assist the processor 650 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A system comprising:
a network device event manager configured to perform the operations of:
sending, to at least one network device controller configured to exchange control messages with a plurality of network devices including a first network device, a first request to temporarily withdraw the first network device from control plane interactions;
triggering, subsequent to sending the first request, an event at the first network device during which the first network device is non-responsive to control plane interactions;
determining that the first network device has completed the event; and
sending, to the at least one network device controller responsive to the determination that the event has been completed, a second request to restore the first network device to control plane interactions;
a network application configured to operate in multiple states, the multiple states including at least:
a first state wherein the network application tolerates, without remedial action, control plane interaction non-responsiveness by the first network device; and
a second state wherein the network application takes remedial action, respective to the first network device, responsive to control plane interaction non-responsiveness by the first network device; and
at least one network device controller configured to perform the operations of:
requesting, responsive to receiving the first request from the network device event manager, the network application to transition to the first state; and
requesting, responsive to receiving the second request from the network device event manager, the network application to transition to the second state.

2. The system of claim 1, wherein, during the event, the first network device is functionally-responsive to data messages.

3. The system of claim 2, wherein a network application tolerates control plane interaction non-responsiveness by the first network device by freezing state information for the first network device.

4. The system of claim 2, wherein a network application tolerates control plane interaction non-responsiveness by the first network device by ignoring any error messages related to the first network device.

5. The system of claim 1, wherein the event is a reboot of the first network device.

6. The system of claim 1, wherein:
the at least one network device controller is configured to send a ready message to the network device event manager when the one or more network protocol managers are prepared to tolerate control plane interaction non-responsiveness by the first network device; and
the network device event manager is configured to trigger the event at the first network device responsive to receiving the ready message.

7. The system of claim 1, wherein the network device event manager is further configured to poll the first network device to determine that the event has completed.

8. The system of claim 1, wherein a first network protocol control manager, in the one or more network protocol managers, controls one of the Address Resolution Protocol, Simple Network Management Protocol, Link Aggregation Control Protocol, Link Layer Discovery Protocol, Open Shortest Path First routing protocol, and the Border Gateway Protocol.

9. The system of claim 1, further comprising the first network device, wherein the first network device is configured to
send, to a second device prior to the event, a first message notifying the second device of the event; and
send, to the second device subsequent to the event, a second message notifying the second device of completion of the event;
wherein the second device is not controlled by the at least one network device controller.

10. The system of claim 9, wherein the second device will, responsive to the first notification message, freeze any gateway address entries for the first network device, and freeze any link aggregation entries that include the first network device, until receipt of the second notification message or until a specified period of time has elapsed.

11. A method comprising:
sending, by a network device event manager, to at least one network device controller configured to exchange control messages with a plurality of network devices including a first network device, a first request to temporarily withdraw the first network device from control plane interactions;
requesting, by the at least one network device controller, responsive to receiving the first message from the network device event manager, a network application to operate in a first state wherein the network application tolerates, without remedial action, control plane interaction non-responsiveness by the first network device;
triggering, by the network device event manager, subsequent to sending the first request, an event at the first network device during which the first network device is non-responsive to control plane interactions;
determining, by the network device event manager, that the first network device has completed the event;
sending, by the network device event manager, to the at least one network device controller responsive to the determination that the event has been completed, a second request to restore the first network device to control plane interactions; and
requesting, by the at least one network device controller, responsive to receiving the second request from the network device event manager, the network application to transition to a second state wherein the network application takes remedial action, respective to the first network device, responsive to control plane interaction non-responsiveness by the first network device.

12. The method of claim 11, wherein, during the event, the first network device is functionally-responsive to data messages.

13. The method of claim 12, wherein a network application tolerates control plane interaction non-responsiveness by the first network device by freezing state information for the first network device.

14. The method of claim 12, wherein a network application tolerates control plane interaction non-responsiveness by the first network device by ignoring any error messages related to the first network device.

15. The method of claim 11, wherein the event is a reboot of the first network device.

16. The method of claim 11, further comprising:

sending, by the at least one network device controller, a ready message to the network device event manager when the one or more network protocol managers are prepared to tolerate control plane interaction non-responsiveness by the first network device; and triggering, by the network device event manager, the event at the first network device responsive to receiving the ready message.

17. The method of claim 11, wherein the network device event manager is further configured to poll the first network device to determine that the event has completed.

18. The method of claim 11, wherein a first network protocol control manager, in the one or more network protocol managers, controls one of the Address Resolution Protocol, Simple Network Management Protocol, Link Aggregation Control Protocol, Link Layer Discovery Protocol, Open Shortest Path First routing protocol, and the Border Gateway Protocol.

19. The method of claim 11, further comprising:

sending, by the first network device, to a second device, prior to the event, a first message notifying the second device of the event; and sending, by the first network device, to the second device, subsequent to the event, a second message notifying the second device of completion of the event;

wherein the second device is not controlled by the at least one network device controller.

20. The method of claim 19, wherein the second device will, responsive to the first notification message, freeze any gateway address entries for the first network device, and freeze any link aggregation entries trunks that include the first network device, until receipt of the second notification message or until a specified period of time has elapsed.

* * * * *